Jan. 16, 1940.  R. G. ASHBURN ET AL  2,187,552
HYDRAULIC TRANSMISSION
Filed July 8, 1938  4 Sheets-Sheet 4
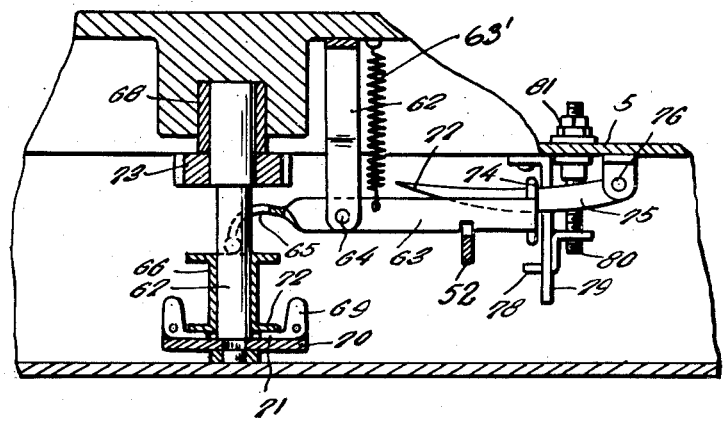
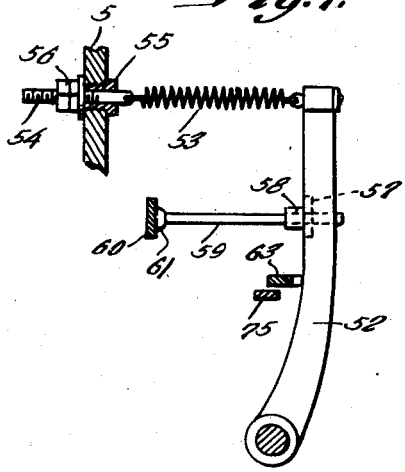
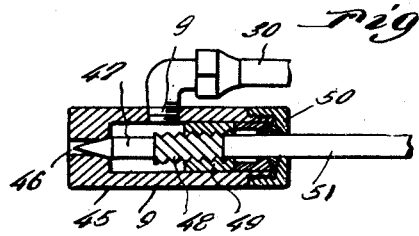
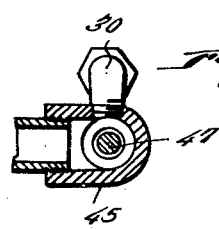
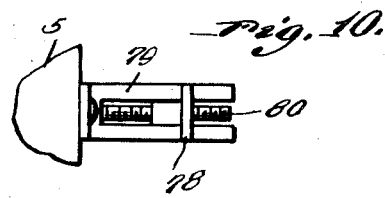
Inventors
R. G. Ashburn
J. D. Lewis
By Clarence A. O'Brien
and Hyman Berman
Attorneys Patented Jan. 16, 1940

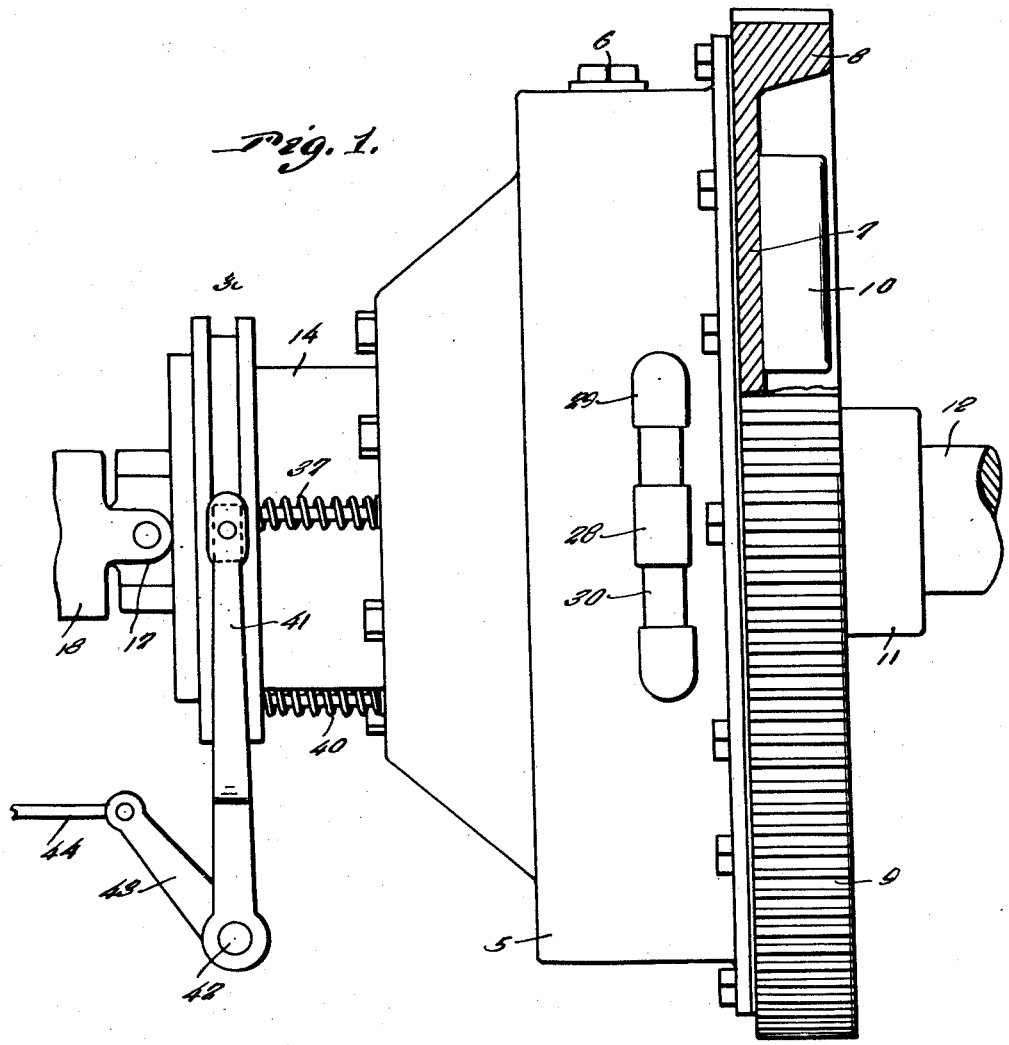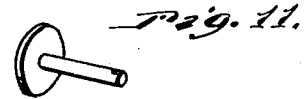

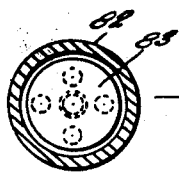

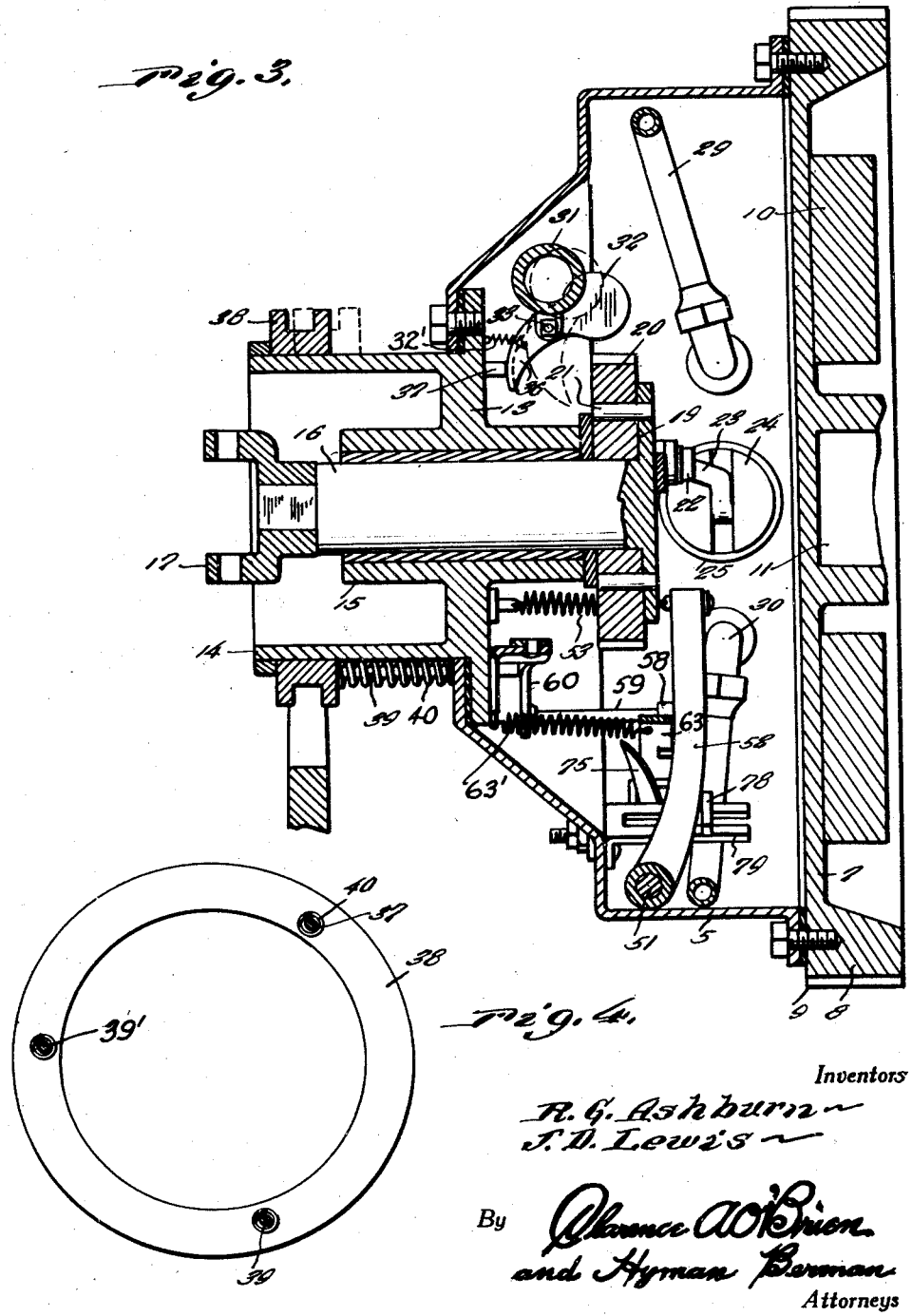

2,187,552

UNITED STATES PATENT OFFICE 2,187,552

HYDRAULIC TRANSMISSION

Roby Glenn Ashburn and John Dalmer Lewis, Mount Airy, N. C.

Application July 8, 1938, Serial No. 218,203

10 Claims. (Cl. 192—60)

The present invention relates to hydraulic transmissions adapted for operatively connecting the drive shaft with a driven shaft of a power plant, such as for instance, the internal combustion engine of an automobile or similar vehicles, and comprises substantially a fluid casing secured to the drive shaft or crank shaft of the engine for rotation therewith, and within which casing one end of the shaft to be driven is journaled, together with a confined fluid within a system carried by the casing and having pump means freely forcing the fluid through the system to provide for the rotation of the drive shaft independently of the driven shaft, said pump means being connected to the driven shaft and manual as well as governor controlled means for restricting passage of the fluid through the system to interrupt the operation of the pump means whereby to cause a unitary rotation of the casing with said driven shaft.

An important object of the present invention is to provide a hydraulic transmission of this character in which manually operable means are employed to momentarily connect the parts for rotation as a unit together with automatic governor control means for maintaining the parts in such connected position. A further object of the invention is to provide a fluid casing of this character which also acts as a fly-wheel for the engine.

A still further object is to provide an apparatus of this character of relatively simple and practical construction, which is efficient and reliable in performance, which may be easily and conveniently installed in operative position with respect to the engine, and which is otherwise well adapted for the purposes for which the same is intended.

Other objects and advantages reside in the details of construction and manner of operation as more fully hereinafter described and claimed, reference being had to the accompanying drawings forming part hereof, wherein like numerals refer to like parts throughout, and in which—

Figure 1 is a side elevational view with the parts broken away and shown in section.

Figure 2 is an end elevational view with the cover plate of the fluid casing removed and with parts broken away and shown in section.

Figure 3 is a transverse sectional view taken substantially on a line 3—3 of Figure 2.

Figure 4 is an end elevational view of the slidable operating collar.

Figure 5 is a sectional view taken substantially on a line 5—5 of Figure 2 and showing one of the check valves.

Figures 6, 7 and 8 are fragmentary sectional views taken respectively on the lines 6—6, 7—7 and 8—8 of Figure 2, Figure 9 is a sectional view taken substantially on a line 9—9 of Figure 8, Figure 10 is a detail of the adjustable stops for the governor actuated lever, and Figure 11 is a perspective view of one of the check valves.

Referring now to the drawings in detail, wherein for the purpose of illustration we have disclosed a preferred embodiment of the invention, the numeral 5 designates the oil casing of the hydraulic transmission having a filler plug 6 and closed at one side by a removable plate 7 having a flange 8, the outer periphery of which is formed with teeth 9 for engagement by a starter gear. The plate 7 is also provided with weights 10 to form a fly-wheel of the assembled structure, as shown to advantage in Figure 3 of the drawings, the plate 7 is formed with a socket 11 within which one end of a drive shaft 12 is fixedly secured to cause a rotation of the casing with said shaft.

To the opposite end of the casing 5 is secured a plate 13 having a drum 14 formed on its outer portion and provided with a central hub 15 within which a driven shaft section 16 is journaled, the outer end of the shaft section being provided with a universal joint 17 for connecting the driven shaft 18 thereto.

The inner end of the driven shaft section 16 is formed with a flange 19 to which a gear 20 is secured by means of pins 21.

An eccentric pin 22 is carried by the flange 19 to which one end of a pair of piston rods 23 are connected, the other end of the rods being connected to pistons 24 working in cylinders 25 secured within the casing 5.

To the inner ends of the pistons 24 are attached leather cuts 26 having a working fit in said cylinders, the top of the cylinders having a common intake and discharge port 27 communicating with a T-fitting 28 connected at its opposite end with intake and discharge pipes 29 and 30 respectively of a fluid system carried by the casing. The intake pipe 29 of each of the pumps communicates with an intake head 31 having its intake end adapted to be closed by a pivotally mounted gate valve 32 pivoted intermediate its ends as at 33 to a bracket 34, the pivot 33 being provided with a coiled spring 35 for yieldably urging the valve against the end of the head 31.

A spring 32' is also provided for opening the valve 32. The opposite end of the valve is formed with an extension 36 engaged by one end of a push rod 37 which is slidably positioned in the plate 13 and projects outwardly from the casing and is fixedly secured to a channeled collar 38 slidably mounted on the drum 14. A similar rod 39 is also slidably mounted in the plate 13 with one end projecting into the casing 5 and its outer end secured to the collar 38. Coiled springs 40 are carried by the rods 37 and 39 and interposed between the collar 38 and the adjacent end of the casing to yieldably urge the collar outwardly. An additional rod 39' may be provided to balance the collar to prevent canting thereof during its sliding movement.

A yoke 41 is provided for engagement with the collar, said yoke being secured to a rock shaft 42 and to which is also secured one end of a crank arm 43 having a manually operable manipulating rod 44 connected thereto, whereby it will be apparent that the collar 38 may be moved along the drum 14 for manipulating the rods 37 and 39.

The discharge pipes 30 leaving the cylinders 25 communicate with a valve housing 45 positioned within the casing, said valve housing having a discharge port 46 therein and constituting a valve seat with which a needle valve 47 is engaged, said needle valve having spiral threads 48 formed thereon engaged with an internally threaded sleeve 49 positioned within the housing 45 as more clearly shown in Figure 8 of the drawings whereby to produce a longitudinal opening and closing movement of the valve upon a rotation of said valve. The end of the housing opposite from the discharge port 46 is provided with a cap 50 having a central opening therein through which the valve stem 51 projects and to which one end of an arm 52 is fixedly secured, the opposite end of the arm having one end of an expansible coiled spring 53 connected thereto, the opposite end of the spring being secured to an adjusting screw 54 slidably inserted through a fitting 55 in a wall of the casing 5 and secured in adjusted position by lock nuts 56. The spring 53 is adapted to yieldably urge the valve 47 into a closed position.

To one side of the arm 52 is secured a lug 57 engageable by a collar 58 formed adjacent one end of a rod 59 which projects through an opening in the lug 57, the opposite end of the rod being secured to a pivoted plate 60 by means of a ball and socket connection 61, said plate being pivoted at one end to a bracket 62 and adapted for engagement by the inner end of the rod 39 for moving the arm 52 against the tension of the spring 53 whereby to open the needle valve 47. Also engageable with the arm 52 is a lever 63 pivotally mounted intermediate its ends as at 64 to the bracket 62, one end of the lever being formed with a yoke 65 engageable with a sleeve 66 slidably mounted on a shaft 67 journaled in bearings 68 in the casing, the opposite end of said sleeve being engaged by governor weights 69 pivoted on a plate 70 secured to the shaft for rotation therewith. The inner ends of the weights are formed with bell-cranks 71 engageable with a flange 72 on the sleeve for slidably actuating the sleeve upon a predetermined rotation of the shaft. The shaft 67 is also provided with a gear 73 in engagement with the gear 20.

The outer end of the lever 63 is formed with a yoke 74 between which is engaged the intermediate portion of a pivoted arm 75, said arm being pivoted at one end to a bracket 76 and having its free end tapered as at 77 and disposed in parallelism with respect to the lever 63 as will be apparent from an inspection of Figure 2 of the drawings, and adapted for engagement with the arm 52 upon a predetermined pivoted movement of said lever. The loose connection thus formed between the lever 63 and arm 75 at a point nearer the pivot 76 and the pivot 64 will cause an increase in the travel of the arm 75 in response to the action of the governor and cause the arm 75 to more quickly engage and actuate the arm 52.

The yoke 74 is adapted for engagement with an adjustable stop 78 slidably mounted in a guide 79 and threadedly engaged by a screw 80 projecting through a wall of the casing 5, the outer end of said screw being secured by a lock nut 81.

The intake pipes 29 and 30 of the fluid system are provided with unions 82 having check valves 83 positioned therein, said check valves being arranged to prevent return flow of the fluid from the direction as shown by the arrows in Figure 2.

In the operation of the device the driven shaft 18 and gear 20 are normally stationary while the casing 5 rotates when the engine is running and the collar 38 is in the full line position as shown in Figure 3. When the collar 38 is moved to the position shown by the dotted lines in Fig. 3, the valve 32 is almost closed by rod 37, and valve 47 is held open by rod 39 which is attached to collar 38. Rod 39 opens valve 47 through pivoted plate 60 which operates valve arm 52. In the idling position pivoted plate 60 pushes valve arm 52 out of reach of governor lever 63 so that the governor can have no control over valve 47.

In the idling position, valve 32 is partially closed to restrict the column of oil that may enter the pumps. The reason for this is that the pumps would otherwise take in more oil than discharge valve 47 and connecting tubings and fittings could discharge without restriction, resulting in a tendency for the device to transmit power. When the device is operating in the idling position, the pumps are permitted to draw in only such quantity of oil that may be discharged without appreciable restriction.

When collar 38 is manually released springs 40 pushes it into position shown by full lines in Figure 3. Such movement causes rod 37 to release valve 32 so that spring 32' will open valve 32. At the same time rod 39 releases pivoted plate 60 to permit spring 53 to draw valve arm 52 to rest on governor arm 63. This motion partially closes valve 47 and throws control of valve 47 on governor. Adjustable stop 78 permits valve 47 to close sufficiently to restrict the fluid and retard operation of the pumps, thus continuing the rotation of the gear 20 and the driven shaft 18. As gear 20 rotates, there is a corresponding reduction in the speed of rotation of gear 73 and of the governor. As the speed of rotation of the governor decreases spring 53 is permitted to gradually close valve 47, further restricting the fluid and retarding operation of the pumps. Upon the closing of the valve 47 sufficiently to completely interrupt circulation of the fluid, the casing 5 and gear 20 will rotate as a unit, thus stopping rotation of the governor, and the drive shaft and driven shaft will rotate together.

It will be noted that a comparatively slight movement is imparted to the sleeve 66 and lever 63 by the governor and in order that this movement may be increased to rotate the valve stem 51 sufficiently to produce the necessary opening movement of the valve 47 through the quick threads 48, the pivoted arm 75 is loosely engaged with the end of the lever 63 and arranged so that the pivoted arm will travel faster than the lever 63 and also will travel beyond said lever for engaging the arm 52 and thus increase the throw of the lever and arm to continue the opening movement of the valve. The drive and driven shafts will accordingly continue to rotate as a unit until the needle valve is again opened by the foot spedal through its connection with the rod 39 and arms 60 and 52.

It is to be understood that a conventional reverse gear mechanism (not shown) should be connected in the driven shaft, preferably between the shaft section 16 and the universal joint 17.

It is believed the details of construction and manner of operation of the device will be readily understood from the foregoing without further detailed explanation.

Having thus described the invention, what we claim is:

1. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, manually operable valve means for closing one of said ports and governor controlled valve means for opening the other of said ports, said governor controlled valve being adapted to close passage through the system to interrupt said pumps and cause unitary rotation of the casing and driven shaft.

2. A hydraulic transmission comprising a fluid casing secured to a drive shaft for rotation therewith, a normally stationary driven shaft having one end journaled in the casing, a confined fluid in the casing, pumps in the casing having pump rods operatively connected to the driven shaft and operable upon the rotation of the casing for forcing fluid through the system, valves controlling said ports, governor controlled means for opening one of the valves and manually operable means for opening said governor controlled valve and substantially closing the other of the valves.

3. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, valves controlling said ports, one of said valves being normally open, governor controlled means for normally maintaining the other of the valves in an open position to effect rotation of the casing independent of the driven shaft, manually operable means for simultaneously closing said first valve and opening said second valve and spring means yieldably urging the valves into their opposite positions.

4. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, valves controlling said ports, governor controlled means operatively connected to the driven shaft and operable by the rotation of the casing relative to the driven shaft for maintaining one of the valves open, manually operable means for simultaneously closing the other of the valves and opening the governor controlled valve and spring means yieldably urging the valves into opposite positions.

5. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, valves controlling said ports, an operating arm for one of said valves, governor controlled means engaging the arm to move the same into open position, manually operable means also engaging said arm to move the same into open position independently of the governor control means, said manually operable means also including means for closing the other of said valves and spring means yieldably urging the valves into opposite positions.

6. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, valves controlling said ports, governor controlled means operatively connected to the driven shaft maintaining one of said valves in an open position during a predetermined speed of the casing relative to the driven shaft, manually operable means for simultaneously closing one of the valves and opening the other valve independently of the governor controlled means and spring means yieldably urging the valves into opposite positions.

7. A hydraulic transmission comprising a fluid casing secured to a drive shaft for rotation therewith, a normally stationary driven shaft having one end journaled in the casing, a confined fluid in the casing, a fluid system having intake and discharge ports in the casing, pumps in the casing having pump rods operatively connected to the driven shaft and operable upon the rotation of the casing for forcing fluid through the system, valves controlling said ports, an operating arm for one of the valves, a governor operatively connected to the driven shaft and operable by the rotation of the casing relative to the driven shaft, a lever operatively engaged at one end with the governor and at its opposite end engageable with the arm to move the valve into an open position during a predetermined rotary speed of the casing relative to the driven shaft, adjustable means regulating the movement of the lever, manually operable means also engaging the arm to move said one valve into open position independently of the governor controlled lever, said manually operable means also including means for simultaneously closing the other of said valves and spring means yieldably urging the valves into opposite positions.

8. A hydraulic transmission comprising a fluid casing having a confined fluid and secured to a drive shaft for rotation therewith, pump cylinders fixed in the casing, pistons working in the cylinders, a driven shaft having one end journaled in the casing, an eccentric connection between the pistons and the driven shaft, said pistons being operated upon the rotation of the casing without normally effecting rotation of the driven shaft, a fluid system connected to the cylinders having ports communicating with the fluid in the casing, intake and discharge valve means controlling passage through the system, either of said valves, when closed serving to stop working of the pistons to provide a rigid drive connection for the driven shaft, governor controlled means for said one said valve means operable to maintain the valve in an open position, said governor controlled means being inactive upon rotation of the casing with the driven shaft and spring means yieldably closing said governor controlled valve.

9. In a hydraulic transmission, a drive member and a driven member, the latter being normally idle, a fluid system embodying a confined fluid carried by the drive member, pump means in the system operable by the drive member and having connection with the driven member and normally operable independently of said driven member and governor actuated control means for the system including a governor actuated during relative movement of the members and idle during unitary movement thereof.

10. In a hydraulic transmission, a drive member and a driven member, the latter being normally idle, a fluid system embodying a confined fluid carried by the drive member, pump means in the system operable by the drive member and having connection with the driven member, manual and governor operated valves for the system operable when one valve is in closed position to effect unitary movement of the drive and driven members through the interruption of the pump means, spring means yieldably opening the manually operated valve and spring means for closing the governor operated valve, said governor being operated during relative movement of the members and idle during unitary movement thereof.

JOHN DALMER LEWIS.
ROBY GLENN ASHBURN.